US010612122B2

(12) United States Patent
Belashchenko

(10) Patent No.: US 10,612,122 B2
(45) Date of Patent: Apr. 7, 2020

(54) PLASMA DEVICE AND METHOD FOR DELIVERY OF PLASMA AND SPRAY MATERIAL AT EXTENDED LOCATIONS FROM AN ANODE ARC ROOT ATTACHMENT

(71) Applicant: Vladimir E. Belashchenko, Waltham, MA (US)

(72) Inventor: Vladimir E. Belashchenko, Waltham, MA (US)

(73) Assignee: Vladimir E. Belashchenko, Waltham, MA (US)

( * ) Notice: Subject to any disclaimer, the term of this patent is extended or adjusted under 35 U.S.C. 154(b) by 0 days.

(21) Appl. No.: 15/686,580

(22) Filed: Aug. 25, 2017

(65) Prior Publication Data

US 2019/0062891 A1 Feb. 28, 2019

(51) Int. Cl.

| | |
|---|---|
| ***B23K 9/00*** | (2006.01) |
| ***B23K 9/02*** | (2006.01) |
| ***C23C 4/134*** | (2016.01) |
| ***F01D 25/08*** | (2006.01) |
| ***H05H 1/28*** | (2006.01) |
| ***H05H 1/42*** | (2006.01) |
| ***H05H 1/34*** | (2006.01) |
| *F01D 5/28* | (2006.01) |

(52) U.S. Cl.

CPC .............. *C23C 4/134* (2016.01); *F01D 25/08* (2013.01); *H05H 1/28* (2013.01); *H05H 1/34* (2013.01); *H05H 1/42* (2013.01); *F01D 5/288* (2013.01); *F05D 2230/312* (2013.01); *F05D 2230/90* (2013.01); *F05D 2300/611* (2013.01); *H05H 2001/3452* (2013.01)

(58) Field of Classification Search

CPC . B05B 5/00; C23C 4/134; F01D 25/08; F01D 5/288; F05D 2230/312; F05D 2230/90; F05D 2300/611; H05H 1/26; H05H 1/28; H05H 1/34; H05H 1/42; H05H 2001/3452

USPC ........................................ 219/121.36–121.59

See application file for complete search history.

(56) References Cited

U.S. PATENT DOCUMENTS

| | | | | |
|---|---|---|---|---|
| 3,958,097 | A | 5/1976 | Fabel et al. | |
| 4,661,682 | A | 4/1987 | Gruner et al. | |
| 4,788,402 | A | 11/1988 | Browning | |
| 4,853,515 | A | 8/1989 | Willen et al. | |
| 5,837,959 | A | 11/1998 | Muehlberger et al. | |
| 5,935,293 | A * | 8/1999 | Detering | B01J 19/088 75/10.19 |
| 6,717,115 | B1 * | 4/2004 | Pfahnl | H01L 21/67103 118/724 |

(Continued)

OTHER PUBLICATIONS

PCT International Search Report and Written Opinion, dated Oct. 12, 2018, in related application Serial No. PCT/US18147857, 9 pp.

*Primary Examiner* — Sang Y Paik

(74) *Attorney, Agent, or Firm* — Steven J. Grossman; Grossman, Tucker, Perreault & Pfleger, PLLC

(57) ABSTRACT

The present invention is directed at a plasma torch and methods of plasma spraying wherein the delivery of plasma and spray material occurs at extended locations from the anode arc root attachment. Relatively high specific power and relatively high enthalpy plasmas are employed along with a plasma extension module to deliver a plasma spray at a remote location with a minimum enthalpy value.

15 Claims, 19 Drawing Sheets

(56) References Cited

U.S. PATENT DOCUMENTS

| | | | | |
|---|---|---|---|---|
| 6,951,587 | B1 * | 10/2005 | Narushima | C23C 16/4586<br>118/728 |
| 9,150,949 | B2 | 10/2015 | Belashchenko | |
| 9,376,740 | B2 | 6/2016 | Belashchenko | |
| 2007/0235419 | A1 * | 10/2007 | Kong | H05H 1/30<br>219/121.36 |
| 2015/0225833 | A1 | 8/2015 | Kowalsky et al. | |
| 2016/0024635 | A1 | 1/2016 | Belashchenko | |

* cited by examiner

PLASMA DEVICE AND METHOD FOR DELIVERY OF PLASMA AND SPRAY MATERIAL AT EXTENDED LOCATIONS FROM AN ANODE ARC ROOT ATTACHMENT

FIELD

The present invention is directed at a plasma torch and methods of plasma spraying wherein the delivery of plasma and spray material occurs at extended locations from the anode arc root attachment. Relatively high specific power and relatively high enthalpy plasmas are employed along with a plasma extension module. Coatings may therefore now be conveniently applied to, e.g., confined or restricted locations of a given substrate designated for plasma coating treatment.

BACKGROUND

One major goal of plasma spraying and plasma treatment of materials includes generation of stable plasmas having the capability to control, within a relatively wide range, the heat and momentum transfer to feedstock thus providing desirable parameters (temperature, velocity, etc.) of feedstock. This in turn provides for the formation of a deposition with required properties in a required area of a part to be sprayed. Additional goals may include control of substrate temperature as well as other conditions of a deposit formation.

In plasma spraying, it is often the case that parts identified for coating may have geometries and areas with relatively limited access where conventional plasma torches may not be efficiently utilized because of their dimensions. Non-limiting examples include internal surfaces of tubes having relatively small diameters of about several centimeters and relatively narrow spaces inside turbine transition pieces or between airfoils used in turbine power generation. For example, the space between airfoils in a first stage nozzle may be about 40 mm or even smaller. Moreover, certain areas targeted for spraying may be relatively difficult to view or not even possible to view, which leads to significant technical challenges to provide an efficiently spray pattern and a relatively high quality coating.

There have been attempts to provide plasma torches and systems for spraying areas having limited accessibility. Examples include: (1) Model 2700 manufactured by Praxair-Tafa and Thermach; (2) Model SG-2100 manufactured by Praxair-Tafa; (2) F210 and F300 manufactured by Oerlicon Metco; and (3) Model 100HE manufactured by Progressive Surface.

FIG. 1 is an illustration of the Model 2700 plasma torch manufactured by Thermach. As shown therein, the plasma torch includes a connecting and distributing module 302, straight extension 304 and plasma torch module 306 which contains the cathode and anode. Extension 304, which is therefore prior to the plasma torch, may enclose for example, power leads, incoming and returning water lines and plasma gas lines. A powder feeding line 312 locates outside of the extension 304. Outside lines supplying cooling air and other means needed to cool spraying surface and to remove or deflect dust are not shown. As may be appreciated, the accessibility of Model 2700 will depend upon the diameter and length of extension 304. Presently, common lengths of the extension 304 is understood to be about 300 mm to 600 mm with diameters of about 21 mm to 26 mm. These torches are also understood to operate at electrical power of below 30-32 kW, having thermal efficiency $\eta$ of about 0.5 or less generating argon based plasmas having enthalpies of 10-12 kJ/g or below. Relatively low power, low $\eta$ and relatively low enthalpy plasmas having values of <12 kJ/g result in relatively low feedstock spray rates of about 20-25 g/min and, relatively often, low deposition efficiency and quality of sprayed coatings.

Attention is next directed to U.S. Pat. No. 4,661,682 entitled "Plasma Spray Gun For Internal Coatings" which is described for insertion in pipes and bores of work pieces and for coating the internal surfaces of said work pieces. Reference is also made to U.S. Pat. No. 5,837,959 entitled "Single Cathode Plasma Gun With Powder Feed Along Central Axis Of Exit Barrel" which describes a plasma gun in which powder is introduced into the gun is entrained in a plasma stream for deposit on a workpiece spaced from the gun. With reference to FIG. 6A of U.S. Pat. No. 5,837,959, the anode arc root attachment is identified at 104 as the spot on the anode wall where the arc 100 terminates. Downstream from such location, there are generally observed significant heat losses to the point where the plasma exits the torch. There is therefore a trend to minimize the length of such a plasma passage (the distance from the anode arc root attachment to the point where the plasma exits the torch) to a value of 30-40 mm or less.

Attention is next directed to U.S. Pat. No. 4,853,515 entitled "Plasma Gun Extension For Coating Slots." The Abstract indicates that the plasma gun for spraying in a recessed region comprises a cathode member and a tubular anode arranged with the cathode member to generate a plasma stream. An elongated tubular extension including a tubular wall with an axial plasma duct therein extends forward of the anode. The tubular extension is described to have a length of 12.5 cm from the cathode tip to an end wall at the end of the plasma duct.

Attention is next directed to U.S. Pat. Nos. 9,150,949 and 9,376,740. As disclosed therein, systems, apparatus and methods have become available for plasma spraying and plasma treatment of material based upon high specific energy plasma gases that may be used to generate a selected plasma.

Accordingly, a need remains for a plasma torch and method that would allow for delivery of plasma and spray material at an location extended from the anode arc root attachment of ≥150 mm, via use herein of a plasma extension module (PEM) optionally including a nozzle module (NM) wherein the enthalpy of the plasma that exits the PEM at the extended location ($H_{EXIT}$) has an value of ≥15 kJ/g.

SUMMARY

A plasma apparatus for depositing a coating comprising a plasma torch having an electrically conductive cathode and an anode module having an electrically conductive anode spaced apart from the cathode and the torch generates a plasma by applying an electric voltage between the cathode and anode and wherein the anode includes an anode arc root attachment location and a plasma exits said anode module with an enthalpy $H_{AM}$. The plasma torch further comprises a passageway to feed plasma gas wherein the plasma gas comprises ≥75 vol. % of molecular gas. An extension module is included and located downstream of the anode arc root attachment location, the extension module containing the plasma and having a length of ≥150 mm from the anode arc root attachment location. The plasma exits the extension module with an enthalpy ($H_{EXIT}$) of ≥15 kJ/g.

In method form, the present invention is directed at a method for plasma deposition of a coating comprising supplying an electrically conductive cathode and an electrically conductive anode spaced apart from one another and generating a plasma by applying an electric voltage between the cathode and anode and wherein the anode includes an anode arc root attachment location located within an anode module and the plasma exiting said anode module has an enthalpy $H_{AM}$. The plasma torch further comprises a passageway to feed plasma gas wherein the plasma gas comprises ≥75 vol. % of molecular gas One then supplies an extension module located downstream of the anode arc root attachment location, the extension module containing said plasma and having a length of ≥150 mm from the anode arc root attachment location. The plasma exits said extension module with an enthalpy ($H_{EXIT}$) of ≥15 kJ/g.

DETAILED DESCRIPTION

For the ensuing description of the present invention, it is noted that plasma specific power (SP) is determined as SP=U*I/G and the enthalpy of the plasma jet exiting a torch is determined as $H_{AM}$=SP*η, where I is the plasma current measured in amps, U is the plasma voltage measured in volts and G is flow of plasma gases measured in gram/sec. The thermal efficiency of the torch is $\eta=(P-P_{LT})/P$ where electrical power P=U*I and $P_{LT}$ is the power losses in the torch. Values of $P_{LT}$ for determination of thermal efficiency can be empirically determined for each torch and a set of spraying parameters by measuring a flow Q of cooling media, e.g. water, as well as water inlet temperature Tin and outlet water temperature Tout. Having such data $P_{LT}$ may be determined as $P_{LT}$=Q*c*(Tout−Tin) where c is the heat capacity of the cooling media.

Figure 1:
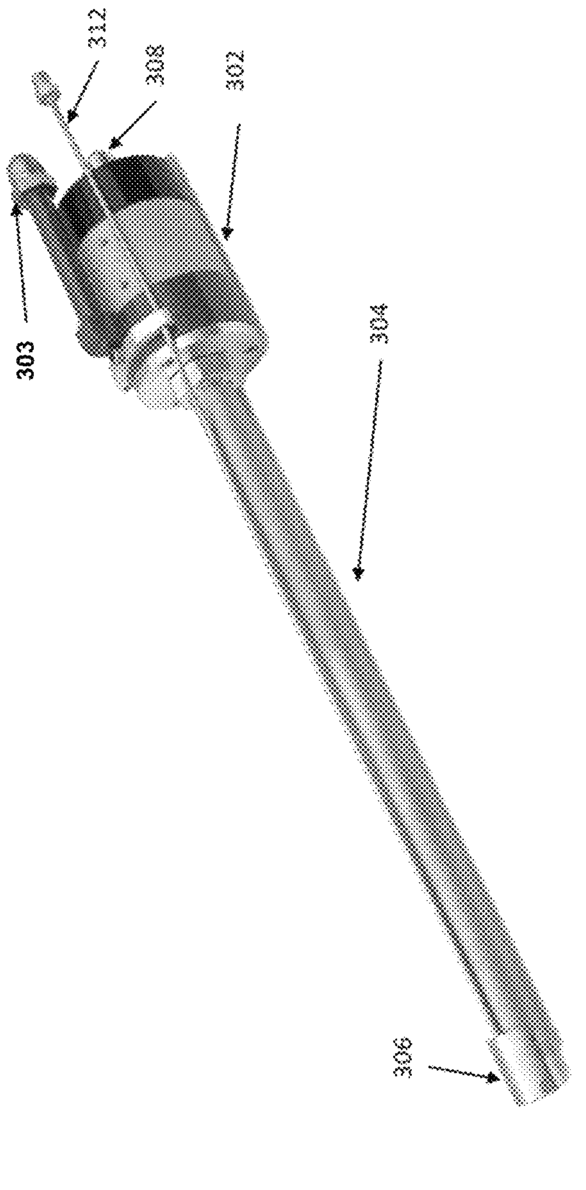
FIG. 1 (Prior Art)
FIG. 1 (prior art) is an illustration of a Model 2700 plasma torch manufactured by Thermach.
Figure 2:
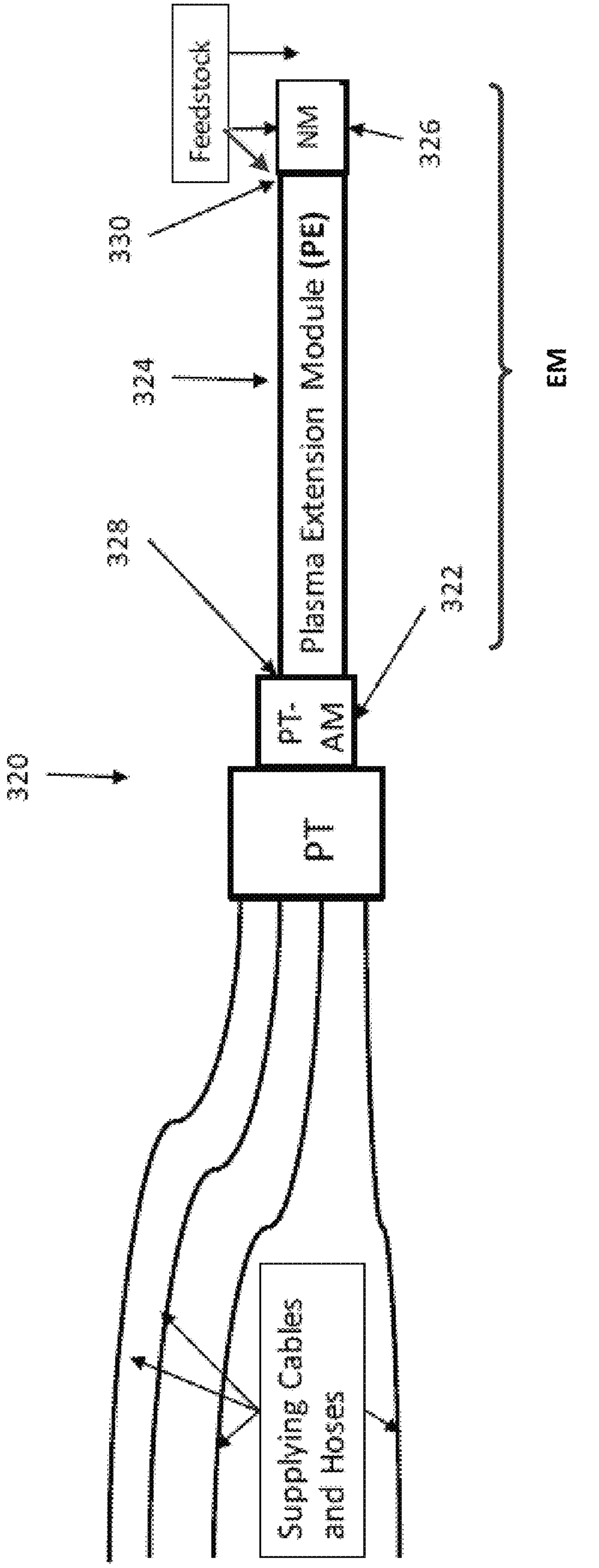
FIG. 2 is a general illustration of a plasma torch including an extension module in accordance with one embodiment of the present invention.

Attention is directed to FIG. 2. As generally illustrated therein the present invention is directed at a plasma torch 320, shown with various supply cables and hoses, having a plasma torch anode module PT-AM or 322 that employs an extension module (EM) comprising a plasma extension module (PEM) or 324 that can be attached to the plasma torch anode module 322. Accordingly, as illustrated in FIG. 2, the EM in this embodiment comprises the PEM and nozzle module NM. However, the EM may include only the PEM where feedstock is then introduced at an end location of the PEM.

The plasma extension module 324 has an upstream portion 328 and downstream portion 330. Accordingly, the upstream end of the PEM 328 is preferably attached to the exit of plasma passage enclosed by the plasma torch anode module (PT-AM) 322. The NM may direct plasma in the desirable direction and adjust the plasma velocity in accordance with a given spraying operation. It should be noted that the plasma extension module 324 may be, as shown, linear and extending on a straight direction, or it may be bent or curved, depending again on a particular spraying operation requirement.

Feedstock may then be introduced to the plasma jet at the regions of the nozzle module (NM) or 326. Feedstock may be introduced in the downstream portion 330 of PEM if the EM includes only the plasma extension module PEM. Feedstock may be also introduced into a plasma jet exiting the EM. The feedstock may be introduced through the supply lines or hoses to one or more passages (not shown) delivering the feedstock to the nozzle module NM or to a downstream portion 330 of the extension module or to the plasma emerging from the extension module.

The extension module herein may be a single module component for attachment to the anode module of the plasma torch or it may include a plurality of module components connected together to form the extension module which extension module operates to contain and allow for the passage of the plasma jet for delivery at a desired location having a minimal value for $H_{EXIT}$. While the extension module may be tubular in shape, other geometries are contemplated, such as elliptical.

Regardless of geometry, it can be appreciated that the present invention is such that the plasma is now one that upon exit from the plasma torch anode module, is efficiently delivered at a distance from the anode arc root attachment location with a sufficient exiting enthalpy value ($H_{EXIT}$) of the plasma exiting the extension module. That is, the extension module provides a length of ≥150 mm, ≥200 mm, ≥250 mm, ≥300 mm, ≥350 mm, ≥400 mm; ≥450 mm; ≥500 mm; ≥550 mm; ≥600 mm; ≥650 mm; ≥700 mm; ≥750 mm; ≥800 mm; ≥850 mm; ≥900 mm; ≥950 mm; ≥1000 mm up to 1050 mm. The extension module may therefore provide an extension for the delivery of the plasma in the range of ≥150 mm up to and include 1050 mm, again, as measured from the anode arc root attachment location.

With respect to the above, it is noted that the enthalpy that exits an extension module as utilized in the plasma torch is such that it has an enthalpy $H_{EXIT}$ of ≥15 kJ/g. It can be appreciated, however, that in the broad context of the present invention, the value of $H_{EXIT}$, while having a minimum value of 15 kJ/g, can preferably have higher values, depending upon: (1) the enthalpy of the plasma exiting the plasma torch anode module 328 and entering an extension module; and (2) the length of the extension module. Accordingly, the value of $H_{EXIT}$ can certainly be higher than the minimum of 15 kJ/g, and may preferably have a value of, e.g, ≥20 kJ/g, ≥25 kJ/g, ≥30 kJ/g, ≥35 kJ/g, ≥40 kJ/g, ≥45 kJ/g, and ≥50 kJ/g. The value of $H_{EXIT}$ therefore can fall in the range of ≥15 kJ/g to 50 kJ/g.

As should now be clear, the plasma extension module 324 as well as the nozzle module 326 can be efficiently cooled by a cooling media, e.g. water, to extend the working life of the PEM 324 and NM 326. Enthalpy losses due to the plasma extension module 324 and nozzle module 326 (if present) due to cooling of the PEM and NM may be designated H* and are preferably controlled so that the enthalpy that exits the torch, as noted above, has the indicated preferred minimum values. For example, in the case where the $H_{EXIT}$ is ≥15 kJ/g, it is understood that the enthalpy of the plasma exiting the AM 322 ($H_{AM}$) is such that $H_{AM}$=$H_{EXIT}$ (≥15 kJ/g)+H*. Accordingly, the values of $H_{AM}$ and the enthalpy losses H* are adjusted to ensure that $H_{EXIT}$ is ≥15 kJ/g.

A preferred plasma torch capable of efficiently generating suitable enthalpy plasmas for use with the herein extension module, which as noted may comprise a plasma extension module (PEM) optionally with the nozzle module (NM), is described in U.S. Pat. Nos. 9,150,949 and 9,376,740, whose teachings are incorporated by reference.

Among other things, such torches preferably provide:

- The ability to utilize numerous plasma gases commonly used for plasma spraying which includes but not limited to $N_2$, $N_2$—$H_2$, $N_2$—Ar, $N_2$—Ar—$H_2$, Ar, Ar—$H_2$, Ar—He.
- The capability to generate plasmas having specific power within 43-140 kJ/g having more than 50.0 vol. % of molecular gases.
  - For plasmas having more than 50% of molecular gases, e.g. $N_2$ or $N_2$—$H_2$, thermal efficiency η is about 70% at SP around 43-50 kJ/g and η is about 55-60% with an average of about 57% at SP>100 kJ/g. Thus SP range 43-140 kJ/g corresponds to a plasma enthalpy range $H_{AM}$ of about 30 kJ/g-80 kJ/g.
- The capability of using a relatively high-voltage, relatively low current approach, which may suitably be used with a wide range of plasma gas flow rates and related plasma parameter like enthalpy, velocity, heat transfer potential.

Figure 3A:
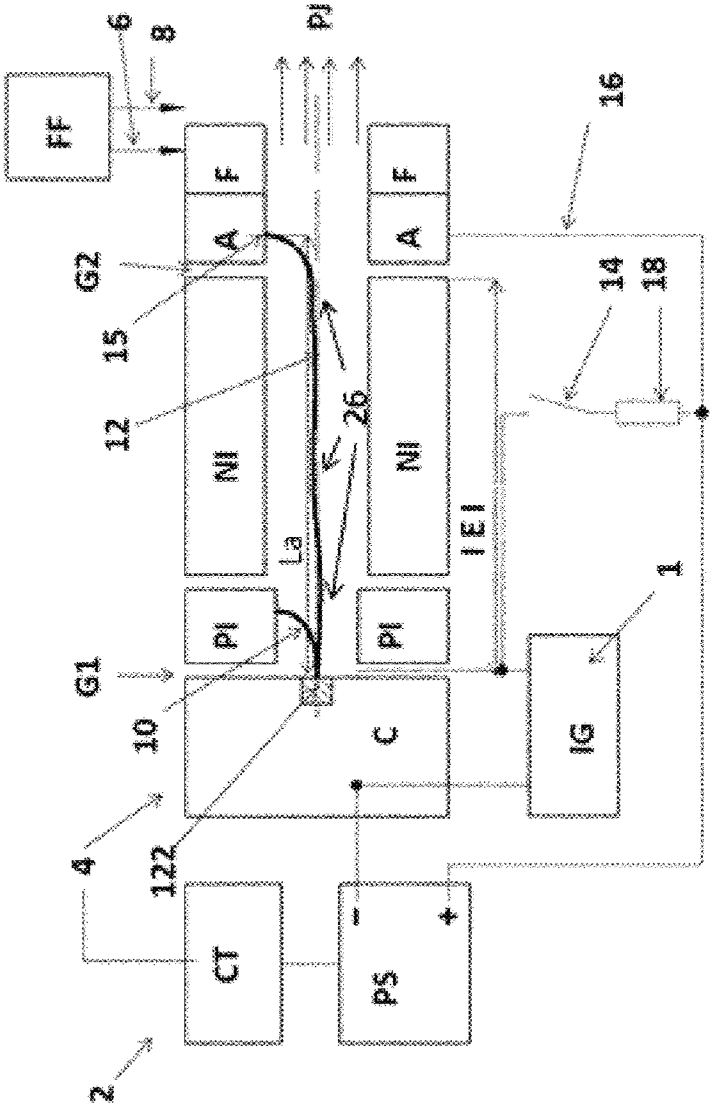
FIG. 3A is an illustration of a schematic of a preferred plasma system.

FIG. 3A illustrates a schematic illustrate of plasma system for modification and optimization herein. As shown the plasma system 2 may generally be based on a plasma torch 4. The plasma system 2 may include a variety of modules. The plasma system 2 schematically depicted in FIG. 3A may include a DC power source module (PS); control module (CT), which may control plasma gases flow rates, the plasma current and voltage, sequence of events during plasma start up and shut down, etc.; plasma ignition module (IG) and ignition circuit 16. The plasma torch 4, itself, may include a cathode module C having at least one cathode 122; an inter-electrode inserts module (IEI) expanding and stabilizing the arc; and an anode module (A). Inter-electrode inserts module may include a Pilot Insert (PI), and at least one neutral inter-electrode insert (NI). A plasma jet forming module (F) may be located downstream of anode arc root attachment for shaping and/or controlling the velocity and temperature of a plasma jet (PJ) exiting the torch. A Feedstock Feeding module (FF) may be provided for introducing a material feedstock into a plasma jet (PJ) of plasma generated by the plasma torch 4. The Feedstock Feeding module may be located downstream of anode arc root attachment and may feed feedstock into a forming means (position 6) or into a plasma jet (position 8). Feedstock herein included material feedstock may be in a form of powder. Feedstock herein may also be in the form of liquid precursor or suspension of fine powders in liquids like ethanol or water. Feedstock herein may also include solid feedstock such as wire, rod, and flexible cord.

A plasma gas G1 may be supplied to the cathode area, e.g., a space formed between the cathode 122 and pilot insert PI, through a passage inside the cathode module C. The plasma gas G1 may be the only gas used to generate plasma. Total gas flow Gp=G1 in this case.

A second plasma gas G2 may also be used to generate the plasma. The second plasma gas G2 may be supplied through a passage located between IEI module and anode module as shown on FIG. 3A. Gp=G1+G2 in this case. G1, G2 and the additional gases may also reduce erosion of electrodes and inserts, undesirable possible arcing between various modules, pilot and neutral inserts and/or minimize erosion of electrodes, control plasma composition, etc.

The cathode 122 may be connected to a negative terminal of a DC power source PS. In one embodiment, the DC power source may produce low ripple current, which may increase the stability of plasma parameters. A very low ripple may be achieved, for example, by using a ripple cancellation technique. An example may be DC power sources ESP-600C or EPP-601 manufactured by ESAB. During plasma ignition the positive terminal of the power source may be connected to the pilot insert PI through the ignition circuit 16.

According to an embodiment here, the ignition circuit 16 may include the ignition module IG, resistor 18, switch 14, control elements, capacitors, choke, and inductors (not shown). The ignition module IG may have a high voltage, high frequency oscillator. The oscillator may initiate a pilot electrical arc 10 between the cathode 122 and the pilot insert PI. The DC power source PS may be employed to support the pilot arc 10. The pilot arc 10 may ionize at least a portion of the gases in a passage 26 formed by sub-passages which may have different diameter for passage of plasma. That is, pilot insert PI may be of one diameter, neutral inserts (NI) may have other diameters, and the anode may define a particular diameter for plasma passage. The low resistance path formed by ionized gas may allow initiation of a main arc 12 in an arc passage 26 between cathode 122 and anode module A. The switch 14 may be disengaged after the main arc 12 has been established, thus interrupting the pilot arc 10. Consistent with one embodiment, several switches (not shown) may be connected to inter-electrode inserts to generate arcs between the cathode 122 and the inter-electrode inserts connected to the switches. Similar to the pilot arc 10, the arcs between the cathode 122 and the inter-electrode inserts may provide a low resistance path to facilitate initiation of the main arc 12, in the event that the length of the main arc 12 is greater than the capability of the ignition circuit utilizing only pilot insert PI.

Figure 3B:
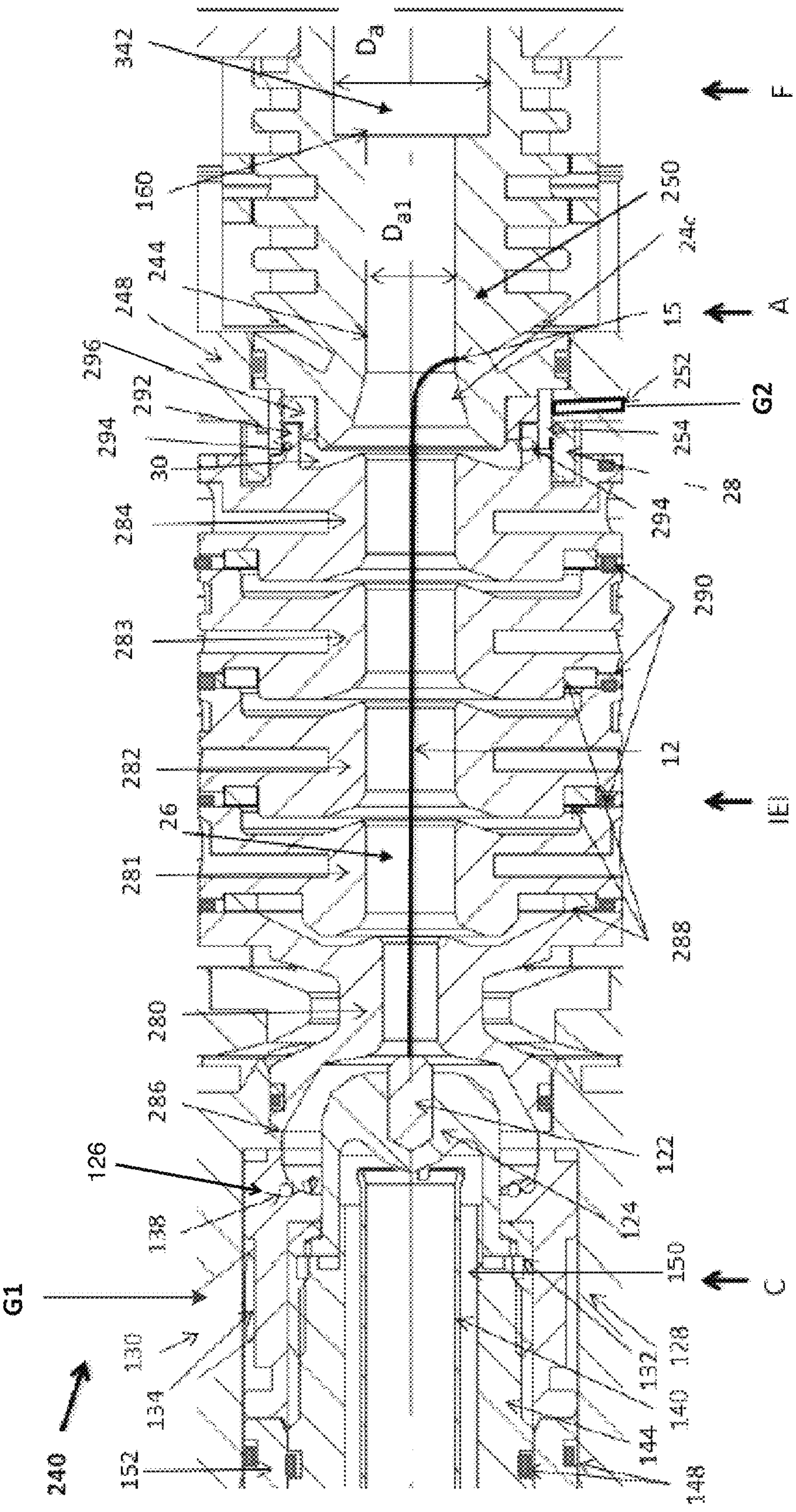
FIG. 3B is an illustration of a preferred plasma torch for use with the extension module of the present invention.
Figure 4B:
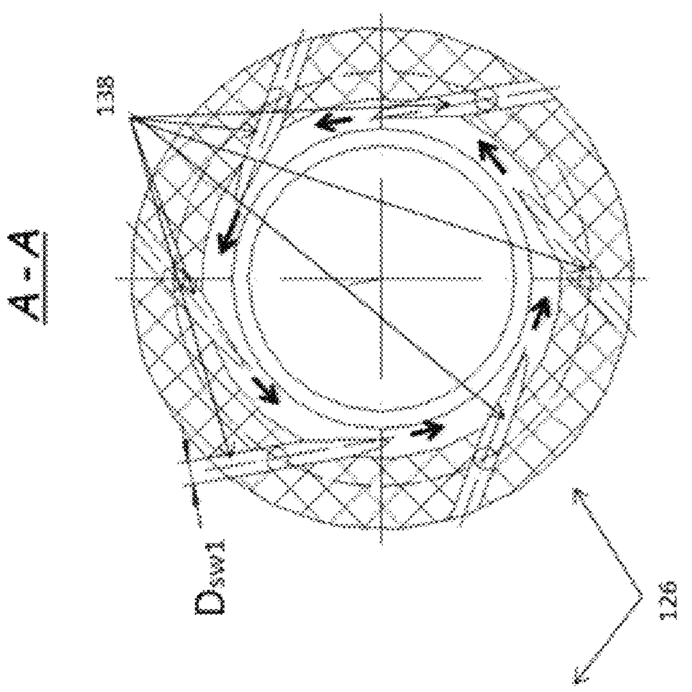
FIG. 4B is another illustration of a portion of the preferred plasma torch for use with the extension module of the present invention.
Figure 4A:
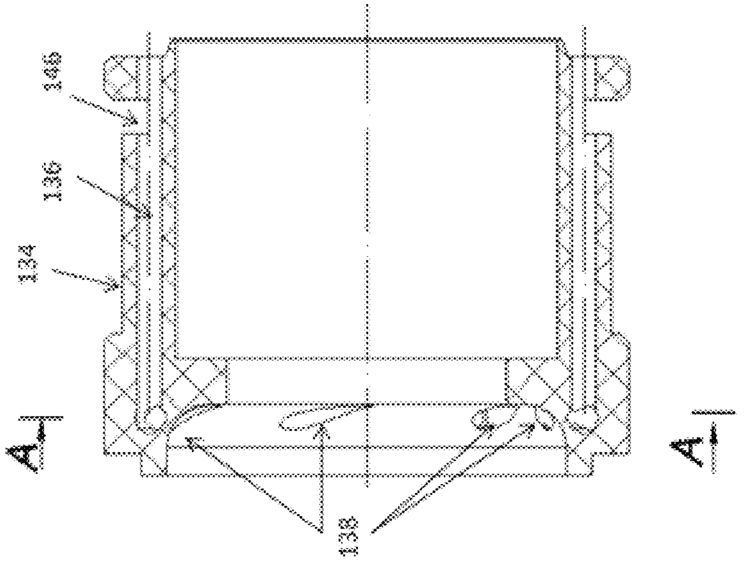
FIG. 4A is another illustration of a portion of the preferred plasma torch for use with the extension module of the present invention.

FIGS. 3B, 4A and 4B now illustrates the preferred torch 240 which Cathode Module C may have a cathode base 124 with cathode insert 122, cathode housing 128, cathode holder 144, cathode nut 132, and cathode vortex distributor 126. Cathode base 124 may be made of high conductivity material, e.g. copper or copper alloy. Cathode base 124, cathode 122 and cathode nut 132 may have electrical contact with cathode holder 144. Cathode holder 144 may be connected to a negative terminal of a DC power source (not shown). Pilot insert 280 may have an electrical contact 286 with cathode housing. Cathode housing 128 and cathode holder 144 may be electrically insulated from each other by cathode insulator 152.

Cathode housing may have a gas passage 130 to feed a G1 portion of a plasma gas to the cathode area, e.g. a space formed between the cathode 122 and pilot insert 280. The gas passage 130 may be connected with cathode vortex distributor 126 having a circular gas receiver 134 connected with radial multiple gas passages 146 which, in turn, are connected to corresponding axial passages 136. Each axial passage 136 may be connected with the vortex orifices 138 providing a tangential component of velocity, thus creating a vortex in the area located between the cathode and pilot insert. Sealing O-rings 148 may be used to seal the gas passages.

In the present disclosure, the G1 flow rate may now be more than 60 vol. % of total plasma gas flow rate Gp, which means G1>0.6Gp, to preferably support the vortex propagation along the plasma channel inside the IEI module. See again, FIG. 3B. The vortex intensity may be characterized by a ratio Vort1=G1/S1 where S1 is a surface area of the G1 vortex orifices 138.

At relatively small G1 flow rates corresponding to $H_{AM}$>30 kJ/g useful stabilization of the arc may be observed for the vortex generated by G1, namely when Vort1>0.1 g/(sec*mm$^2$). Plasma gas flow is measured in g/sec and surface area is measured in mm$^2$ to calculate the vortex intensity. Other units of measurements may be used as well with related changes in the calculated values of vortex intensity.

An inter-electrode inserts module may consist of a pilot insert 280 and one or more neutral inserts. Four neutral inserts 281-284 may be used in the depicted embodiment. Inserts 281-284 may have the same diameter. Diameters of neutral inserts may also increase downstream providing plasma passage profile and related independent plasma velocity control. The neutral inserts may be electrically insulated from each other and from pilot insert 280 by a set of ceramic rings 288 and sealing O-rings 290.

Anode module A may consist of anode housing 248 and anode 250. The anode may have an entrance converging zone 24*c* connecting with a cylindrical zone 244 having diameter Da1. Transition zone 24 in the plasma passage between IEI module and cylindrical part 244 of the anode in this embodiment is formed by anode entrance zone 24*c* and an expansion zone 30 which is configured as a discontinuity in plasma passage 26. Downstream neutral insert 284 may have a circular lip 292 protruding into expansion zone 30 and having G2 vortex orifices 294 connected with circular gas distributor 254 and forming Vort2 in the transition zone. G2 plasma gas is fed into gas passage 252 located in anode housing 248 and connected with circular gas distributor 254 formed by ceramic ring insulator 28 and additional insulating ceramic ring 296. It may be noted that the position of vortex orifices may be changed for the anode entrance zone by just modification of ceramic rings 28 and 296.

Minimum vortex intensity related to G2 may be on the same level as for G1, i.e. Vort2>0.1 g/(sec*mm2). However, G2 flow may be lower than 0.4 Gp in this case which may follow from G1>0.6 Gp. The techniques to feed G2 into the plasma channel may be preferably located relatively close to the anode arc root attachment, preferably 3-25 mm upstream of the arc root attachment. Thus, by feeding G2 close to the anode arc root attachment, a minimum or no decrease of vortex intensity in the area of arc root attachment may be expected which may result in relatively long life of an anode.

G2 maximum vortex intensity may be estimated as Vort2 (max)=0.4 g/(sec*mm2). Increasing of Vort2 above this level may not be desirable and may result in excessive tangential component of plasma jet velocity and related disadvantages dealing with material feedstock precise feeding into the desirable areas of plasma jet. Thus, the vortex range of intensity may be disclosed as 0.4 g/(sec*mm) >Vort2>0.1 g/(sec*mm$^2$). Combination of G1 and G2 vortices with the disclosed flow rates and intensity may already result in relatively high stability of plasmas having SP>43 kJ/g and $H_{AM}$>30 kJ/g.

The main plasma arc 12 locates in the plasma arc passage 26 between cathode 122 which may be connected to a negative terminal of DC power source and the anode arc root attachment 15 which, as a rule, locates preferably near or on the upstream portion of the cylindrical portion 44 and adjacent to the entrance zone 24*c* of the anode 250. Anode 250 may be connected to a positive terminal of DC power source. Plasma passage 342 located downstream of anode arc root attachment 15 may have plasma forming means which may control plasma passage geometry and adjust plasma velocity in accordance to technological requirements to plasma exiting anode module.

Figure 5:
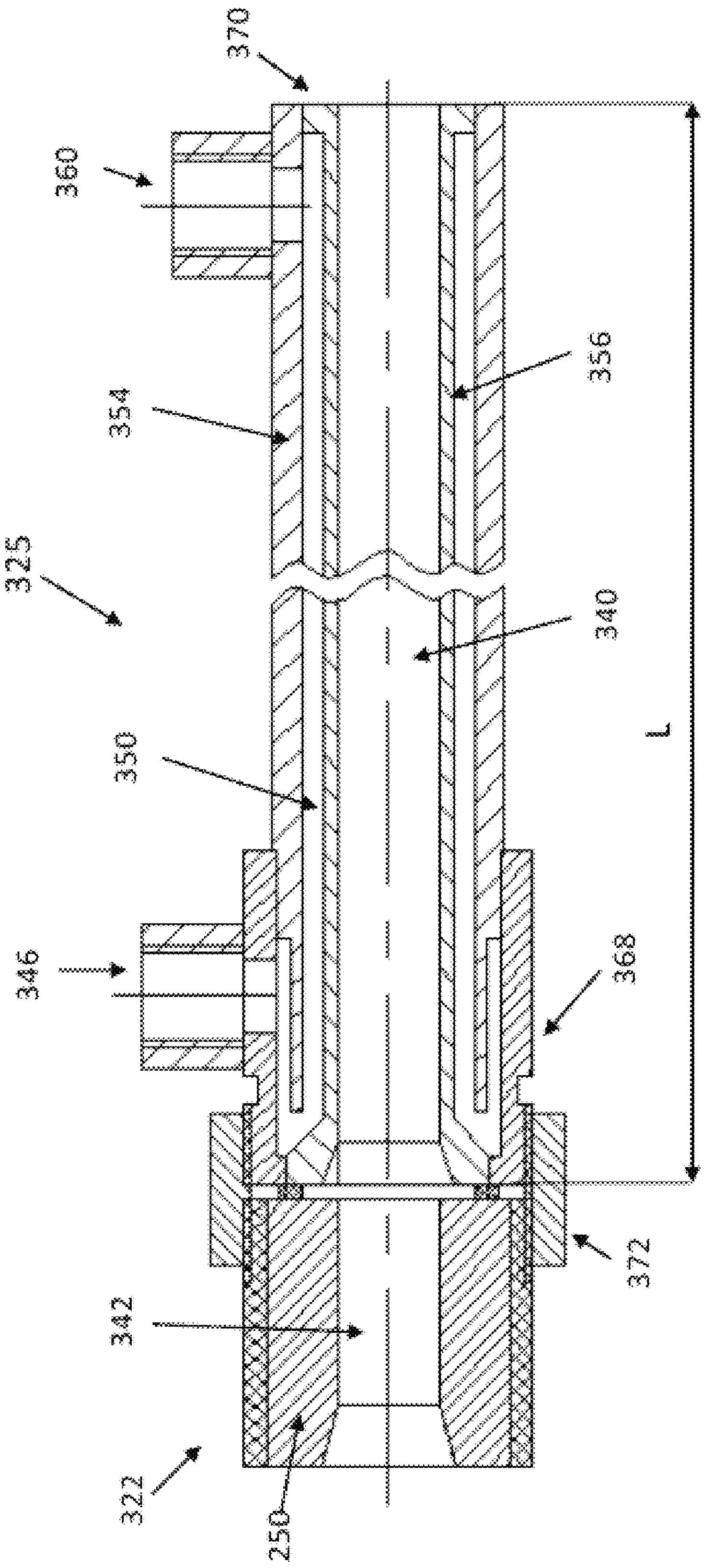
FIG. 5 is a cross-sectional view of another example of a plasma extension module in accordance with the present invention.

FIG. 5 is a cross-sectional view of another example of a plasma extension module 325 in accordance with the present invention. The module 325 preferably includes the inner extension tubing 356 having an internal diameter ID=$D_1$ which forms a plasma passage 340 having length L. Plasma passage 340 is coaxial to plasma passage 342 inside anode 250 of the plasma torch. The inner extension tubing 356 is preferably made of copper or copper alloys having relatively high thermal conductivity of about 350-390 W/(m*K). The tubing 356 may have an outer diameter $D_2$ and wall thickness $h=(D_2-D_1)/2$.

The module also preferably includes an outer sleeve 354, upstream flange 368 and downstream flange 370 which are brazed together with 354 and 356 as shown in FIG. 5 forming a cooling passage 350. The cooling circuit also preferably includes a water inlet line 346 and water outlet line 360. Water inlet and outlet lines may preferably have temperature gauges (not shown) measuring inlet temperature Tin and outlet temperature Tout. The water inlet or outlet lines may also have a water flow gauge measuring water flow Q which, together with Tin and Tout data, allow one to calculate the heat losses in the plasma extension module 325. Plasma extension module 325 is preferably connected to anode module 322 of a plasma torch by a nut 372.

A preferred range of working conditions the preferred plasma apparatus herein is as follows:

Voltage (U) above 100 V and current (I) below 500 A

G1 portion of plasma gas is greater than 0.6 Gp where Gp is a total amount of plasma gas Vortex intensity Vort1=G1/S1 formed by G1 portion of plasma gas is greater than 0.1 g/((sec)(mm$^2$)) where S1 is surface area of G1 vortex orifices Vortex intensity Vort2=G2/S2 formed by G2 portion of plasma gas is greater than 0.1 g/((sec)(mm$^2$)) and smaller than 0.4 g/((sec)(mm$^2$)) where S2 is surface area of G2 vortex orifices The following parameters were varied to evaluate the heat losses in the plasma extension module 325:

Plasma gases: Ar; Ar-20% $H_2$; $N_2$; $N_2$-20 vol. % $H_2$; $N_2$-30 vol. % $H_2$ Length of the plasma extension 325 (L, mm): 50; 100; 200; 300; 600

Plasma gases total flow rate (Gp, g/sec); 1.0; 1.5.

Diameter of the plasma passage 340 ($D_1$, mm): 6.0; 7.0; 10.0

Wall thickness of the inner copper tubing 356 (h, mm): 1.0; 2.0; 3.0.

Cooling water flow rate through the extension 325 (Q, g/sec): 48.2; 68.5; 96.4

Table 1 below compares argon based plasmas and nitrogen based plasmas utilizing a plasma extension module having a length from the anode arc root to the exit of the plasma torch of 115 mm, with a diameter $D_1$ of 7 mm; h=2 mm; and Gp=1 g/sec.

TABLE 1

| Parameters | I, amps | U, volts | P, kW | SP, kJ/g | η | $H_{AM}$, kJ/g | Ση | $H_{EXIT}$ |
|---|---|---|---|---|---|---|---|---|
| Ar | 300 | 125 | 37.5 | 37.5 | 0.43 | 16.20 | 0.20 | 7.50 |
| Ar-20% $H_2$ | 300 | 174 | 52.2 | 52.2 | 0.52 | 27.10 | 0.27 | 13.9 |
| $N_2$ | 300 | 221 | 66.3 | 66.3 | 0.63 | 41.50 | 0.45 | 29.90 |
| $N_2$-20% $H_2$ | 300 | 269 | 80.7 | 80.7 | 0.66 | 53.50 | 0.49 | 39.40 |

It can be seen that for the same plasma gas total flow rate of about 1 g/sec and the same current of about 300 A the resulting torch voltage (U), power (P), specific power (SP), thermal efficiency (η) and enthalpy at the exit of the anode module ($H_{AM}$) as well as enthalpy of the plasma gas at the exit of the extension module ($H_{EXIT}$) after passing through the extension module and 115 mm from the anode arc root attachment, and the total thermal efficiency (Ση) of the plasma system, are significantly larger for nitrogen based plasmas in comparison with argon based plasmas. For example, the enthalpy at the exit $H_{EXIT}$ for the $N_2$—$H_2$ based plasmas are about 2.5-3 times or even larger than when argon based plasmas are utilized. Thus, argon based plasmas are not as preferred for use with the plasma systems herein having a plasma extension module. Moreover, the amount of argon in $N_2$—$H_2$—Ar and similar mixtures of molecular and monatomic plasma gases may not exceed 25% to keep relatively high Ση. Total thermal efficiency is $\Sigma\eta=(P-P_{LE}-P_{LT})/P$ and takes into account both power losses in the torch $P_{LT}$ and power losses in the plasma extension $P_{LE}$. Molecular plasma gases are reference to gases other than monatomic gases, such as diatomic gases.

As noted earlier, the heat losses in a plasma extension module ($P_{LE}$) appear to depend significantly on the enthalpy of the plasma emerging from the anode module ($H_{AM}$) and extension length L. Plasma gas composition and $H_2$ content have relatively smaller influence on $P_{LE}$, when amount of monatomic gas, e.g. argon, is below 25 volume percent. Variations of diameter $D_1$ of the plasma passage 340, wall thickness h and water flow rate Q indicated an insignificant influence on $P_{LE}$.

In accordance with experimental data $P_{LE}$ may be described by the following equation $$P_{LE}=H_{AM}/(1+1/k^*L) \tag{1}$$

where L is measured in millimeters, k is a coefficient and k=0.0025 to 0.005. This range of k takes into account the insignificant dependence of $P_{LE}$ on the plasma gas composition, $D_1$, h as well as Q. The exact value of k is determined experimentally. It may be noted that the above formula for $P_{LE}$ may be easily transferred to the following 2 formulas which may be useful for estimation of $H_{EXIT}$ as a function of both L and $H_{AM}$ as well as maximum values for the maximum length of plasma extension module 325 Lmax while still allowing one to achieve the desirable enthalpy $H_{EXIT}$ at the exit of a plasma extension module:

$$H_{EXIT}=H_{AM}/(1+k^*L) \tag{2}$$

$$L\text{max}=(H_{AM}/H_{EXIT}-1)/k \tag{3}$$

Table 2 provides approximate estimates of Lmax for different values of $H_{AM}$ and $H_{EXIT}$ which were calculated at k=0.004:

TABLE 2

| $H_{EXIT}$, | $H_{AM}$, kJ/g | | | | | |
|---|---|---|---|---|---|---|
| kJ/g | 30 | 40 | 50 | 60 | 70 | 80 |
| 15 | 250.0 | 416.7 | 583.3 | 750.0 | 916.7 | 1083.3 |
| 21 | 107.1 | 226.2 | 345.2 | 464.3 | 583.3 | 702.4 |
| 28 | 17.9 | 107.1 | 196.4 | 285.7 | 375.0 | 464.3 |
| 35 | | 35.7 | 107.1 | 178.6 | 250.0 | 321.4 |
| 50 | | | | 50.0 | 100.0 | 150.0 |

It can now be appreciated that plasma torches providing $H_{AM}$ about 30 kJ/g may utilize extensions of about 250 mm and still provide an exit enthalpy $H_{EXIT}\geq 15$ kJ/g. On the other hand, for a plasma torch that provides an enthalpy at the anode module of 80 kJ/g, as in the present invention, it has now been recognized that one can provide a plasma module extension of about 1000 mm and still deliver a plasma with an exit enthalpy of 15 kJ/g.

Figure 6:
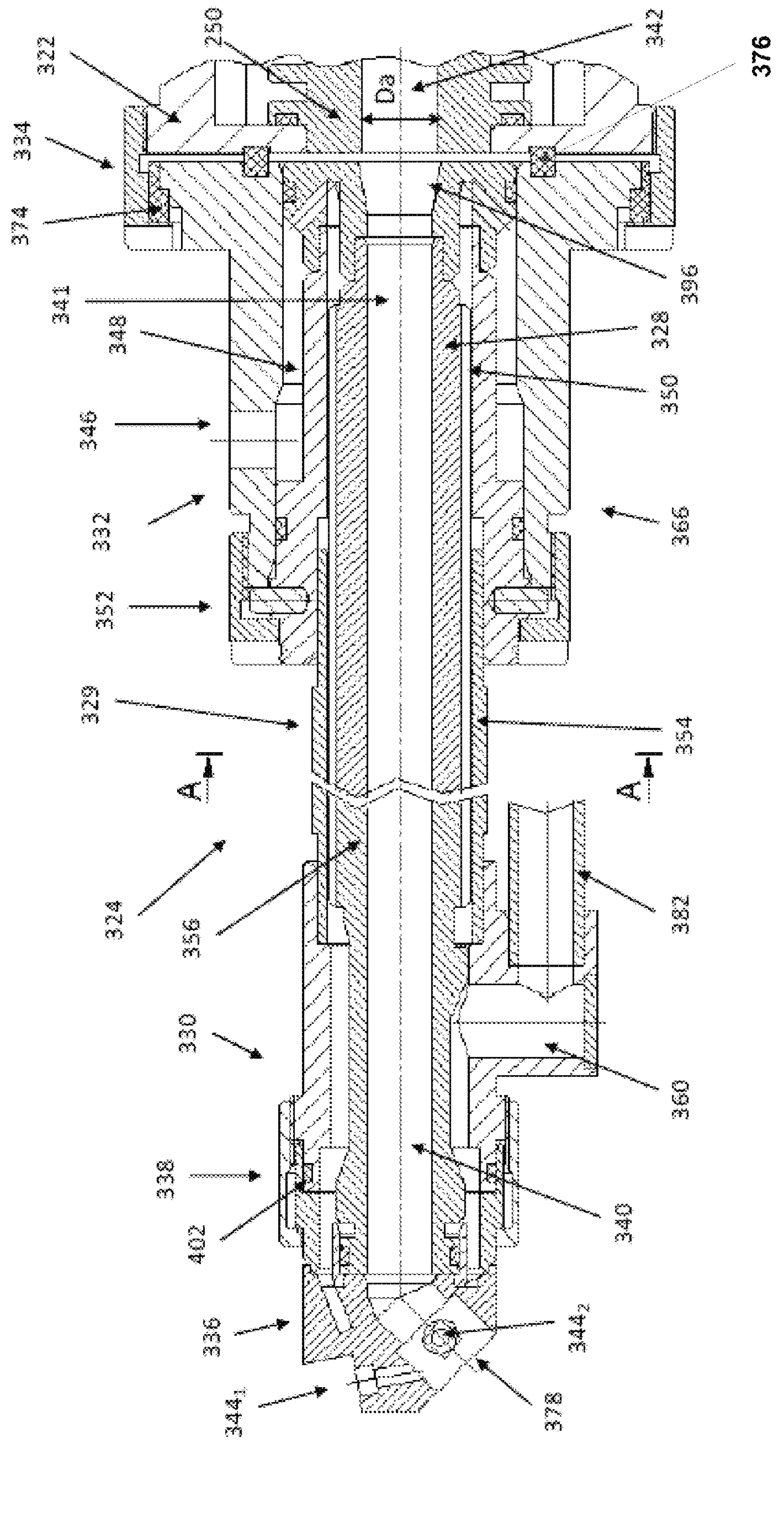
FIG. 6 is a cross-sectional view of the straight option of the plasma extension module.

FIG. 6 illustrate a cross sectional view of a straight option of the plasma extension module 324. The extended plasma passage 340 is enclosed into the plasma extension module 324 and nozzle module 336. Plasma extension module 324 includes upstream 328 and middle 329 portions and a downstream 330 portion. However, middle portion 329 may be connected directly to the nozzle module 336 as well when the downstream portion 330 is not needed. The middle portion 329 includes an outer sleeve 354 the surrounding the inner extension tubing 356. Therefore, the middle portion 329 could be easily bent and curved which is discussed further herein. The upstream part 341 of the extended plasma passage 340 is preferably coaxial to plasma passage 342 inside the anode 250. The upstream portion 328 of the plasma extension module 324 may be inserted in a housing 332 and connected to the housing by extension nut 352 forming the extension—housing assembly 366 comprising extension 324 and upstream housing 332.

The assembly 366 may be connected to anode module 322 of a plasma torch. Nozzle module (NM) 336 is preferably connected to the plasma extension 324 by a nozzle nut 338. NM 336 may preferably have one or a plurality of openings 344 for injection of feedstock into the plasma passage. One top opening $\mathbf{344_1}$ and one side opening $\mathbf{344_2}$ are shown in FIG. 6.

It may be noted that some erosion in the conical part 396 of upstream area 328 of the plasma extension 324 was randomly observed when the plasma extension module was not electrically insulated from from anode module 322. Accordingly, in this situation, it is preferred that the plasma extension 324 is electrically insulated from the anode module 322 by, e.g., a plastic insulating ring 374 and ceramic insulating ring 376.

There may be variety of other options of feedstock feeding into the plasma passage enclosed in the NM and/or into a plasma jet exiting from the NM 336. The amount of feedstock injectors, their positions, diameters and other characteristics can depend on requirements for individual coatings and deposition rates, as well as nozzle module design, available power and the enthalpy of plasma exiting from the nozzle module 336 ($H_{EXIT}$). Powder injection similar to those depicted on FIG. 2 may be utilized as well. Material feedstock may be in a form of powder. It may also be in a form of liquid precursor or suspension of fine powders in liquids like ethanol or water. Solid feedstock like wire, rod, and flexible cord may be used as well.

Plasma extension 324 and nozzle 336 modules may be preferably cooled by a liquid coolant, e.g. water. The cooling circuit may consist of a water inlet 346 and water outlet 360. Water outlet 360 may be a part of the downstream portion 330 of plasma extension 324. Water inlet 346 may be connected with a receiver 348 inside the upstream housing 332 and cooling passage 350 formed by an outer sleeve 354 and inner extension tubing 356.

Figure 7:
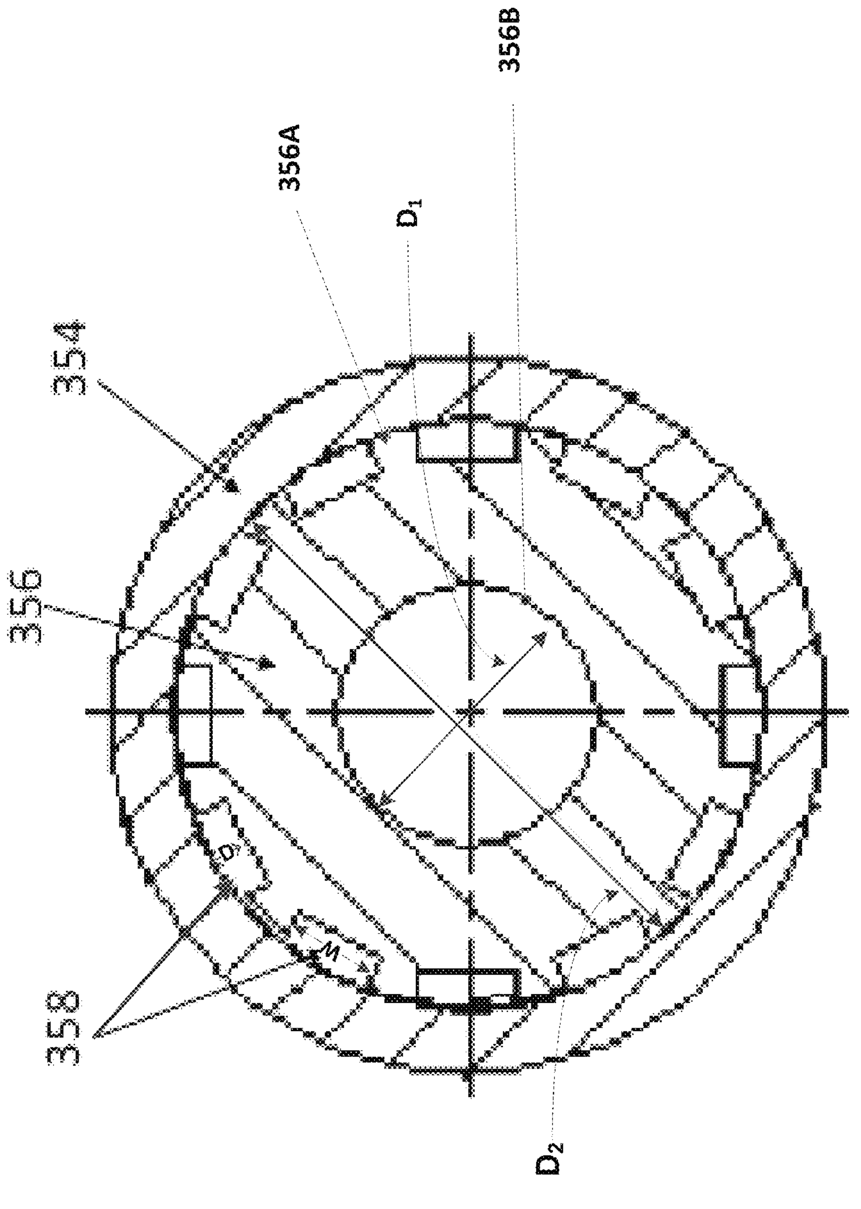
FIG. 7 illustrates one preferred option of a cross section of the outer sleeve and inner extension tubing.

FIG. 7 shows one preferred option of a cross section of the outer sleeve and inner extension tubing in more detail. The sleeve 354 may be made of stainless steel. The inner extension tubing 356 may be made of copper or copper alloys having high thermal conductivity of about 350-390 W/(m*K). The outer sleeve 354 is positioned such that it surrounds the outer surface 356A of the inner sleeve, wherein the inner surface 356B of the inner tubing serves to confine and direct the plasma jet. Cooling passages 350 may be formed by multiple grooves 358 made in the outer surface 356A of the inner tubing 356. The inner tubing 356 may slide and fit to the sleeve 354 thus providing an additional rigidity to the the extension 324 which may be useful for improved control and positioning of the plasma jet. It may also be appreciated that grooves 358 control the surface area of the cooling passages 350 and under those circumstances where an extension module herein is bent or curved, the grooves are such that they continue to provide cooling and the cooling passages 350 do not become otherwise restricted.

Grooves 358 preferably have a width (W) in the range of 1.0 mm-3.0 mm and a depth (D) of 0.5 mm to 2.0 mm. The plurality of grooves so provided preferably provides a flow rate of water in the range of 3.0 liters/min to 20.0 liters/min. For example, for torches having P of about 100 kW the plasma passage diameter $D_1$ may be about 7.0 mm to 8.0 mm. The inner extension copper tubing 356 preferably has an outer diameter $D_2$=14.0 mm providing a 3.5 mm wall thickness for $D_1$=7.0 mm and 3.0 mm wall thickness for $D_1$=8.0 mm. Tubing 356 may have 1.0 mm to 1.5 mm depth for the water cooling grooves thereby providing sufficient flow of the cooling water. The stainless steel sleeve may have a 1.0 mm to 1.5 mm wall thickness and an outer diameter Dss of about 16.0 mm to 17.0 mm.

For torches having a value of P of about 20 kW to 50 kW, $D_1$ may be 4.0 mm and $D_2$=7.0 mm providing 1.5 mm wall thickness. Water cooling grooves may have a depth of 0.75 mm to 1.0 mm depth. Thus, Dss may be about 9.0 mm if the stainless sleeve 354 has approximately 1.0 mm wall thickness. Other options may be considered as well but as can be appreciated, the value of Dss may fall in the range of 7.0 mm to 35.0 mm, more preferably 9.0 mm to 27.0 mm.

Figure 8:
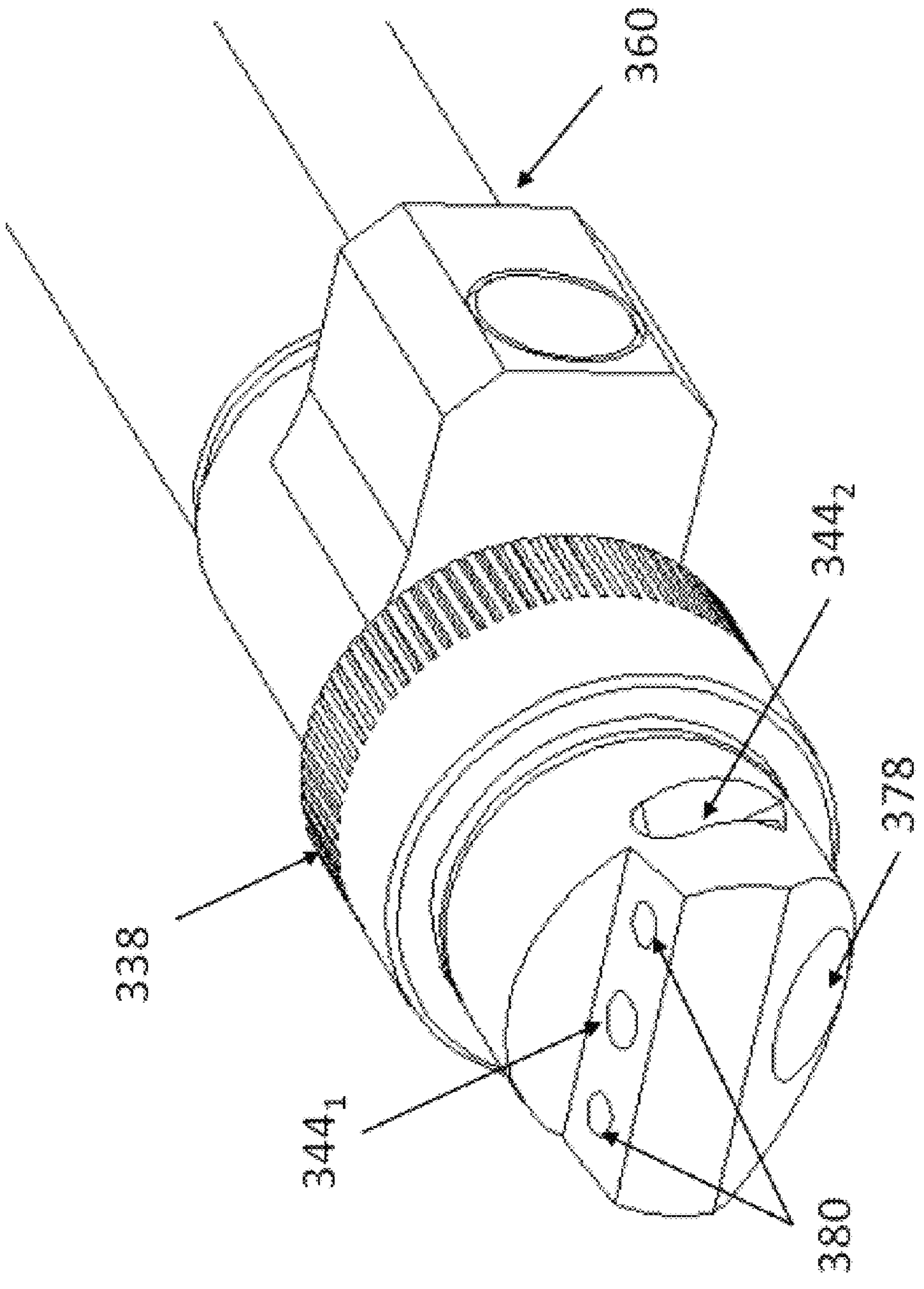
FIG. 8 illustrates the side position of the water outlet 360.

The position of water outlet 360 may be adjusted in accordance to configuration of a part to be sprayed and other technological requirements, thus providing better accessibility. FIG. 6 illustrates the bottom position of water outlet which coincides with the direction of the nozzle exit 378. FIG. 8 illustrates the side position of the water outlet 360.

Figure 9A:
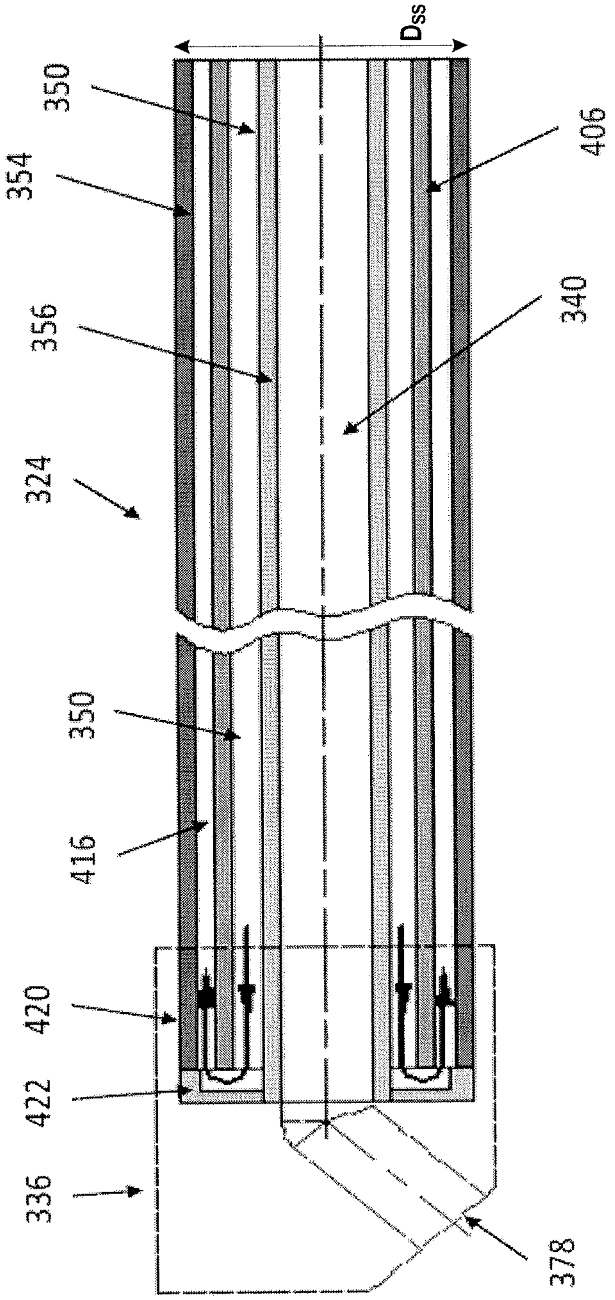
FIGS. 9A and 9B illustrate a preferred option of having an internal passage for the water return of the plasma extension module.
Figure 9B:
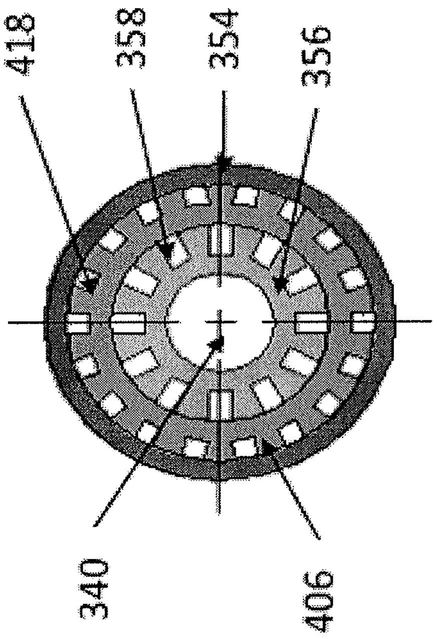

Other positions of water outlet 360 as well as other cooling options may be also integrated into the ID plasma system including arrangement of a single cooling circuit by combining cooling circuits of a torch and a plasma extension module. For example, FIGS. 9A and 9B depict another preferred option of having an internal passage for the water return. The extension 324 in this case may consists of an inner extension tubing 356 with grooves 358 for inflow of water, a middle grooved sleeve 406 for outflow of water, an outer sleeve 354 and flange 422 brazed to sleeve 354 and tubing 356. Incoming water passage 350 formed by tubing 356 and middle sleeve 406 consists of multiple incoming water grooves 358 made in 356. Outgoing water passage 416 formed by the middle sleeve 406 and outer sleeve 354 consists of multiple outgoing water grooves 418 made in 406. The module 324 doesn't have a water outlet 360 and water tubing 382 which may improve accessibility in some cases. Moreover, grooves 418 also control the surface area of the outgoing cooling water passages 416 with relatively minimum or not variation even after bending of the extension module. However, the resulting outer diameter Dss of the extension 324 may be slightly bigger in comparison with the option disclosed above and depicted on FIG. 6 which may create some disadvantages in other cases.

Figure 10A:
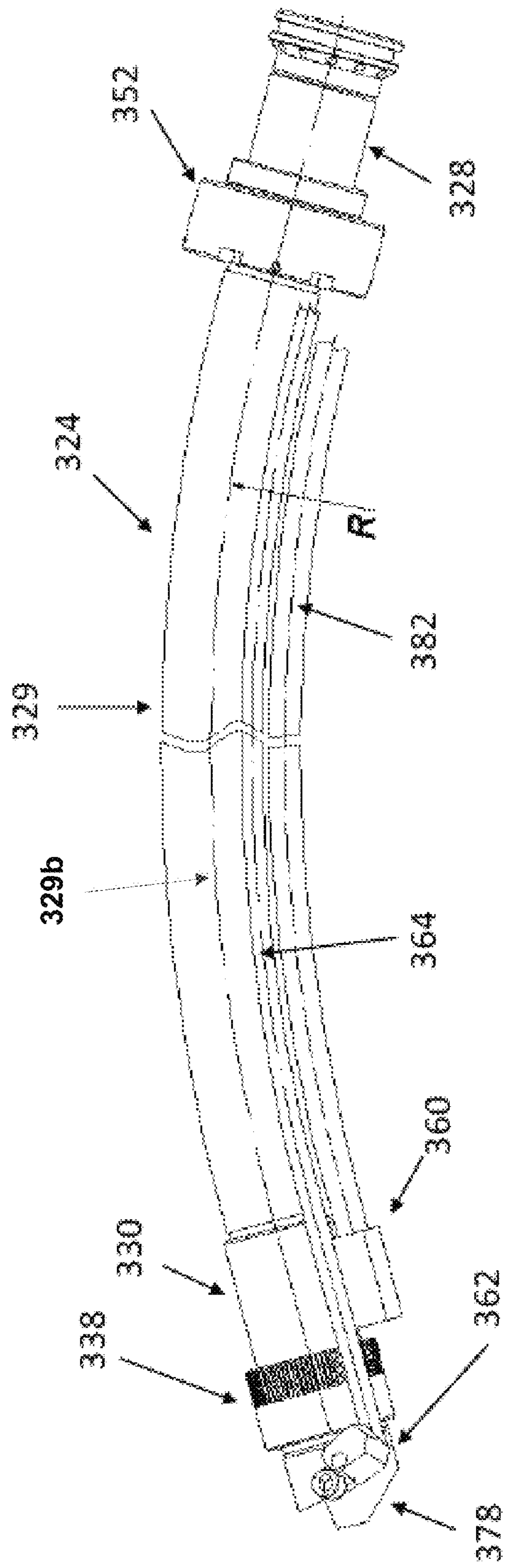
FIG. 10A illustrates a bent or curved option for the plasma extension module.

FIG. 10A illustrates one of the bent or curved options of the plasma extension module 324. The portion 329 depicted on FIG. 10A has Dss of about 18.0 mm and a bending radius of about 425 mm to 450 mm to facilitate spraying between two airfoils 384 of a turbine component 390 illustrated by FIGS. 11 and 12. The feedstock feeding tubing 364 and water tubing 382 are bent as well.

For the bending of tubes, it is generally recommended that the bending radius R is larger than two to three outer diameters of the tube. Smaller bending radius may result in changes in plasma passage 340 and water grooves 358 surface areas. Thus, for the preferred bent or curved option R>(2-3)*Dss, where Dss is the outer diameter of the sleeve 354. Utilizing these preferred values of R, the bending radius R is, e.g., about 54 mm for Dss=18 mm and 27 mm for Dss=9 mm.

Figure 10B:
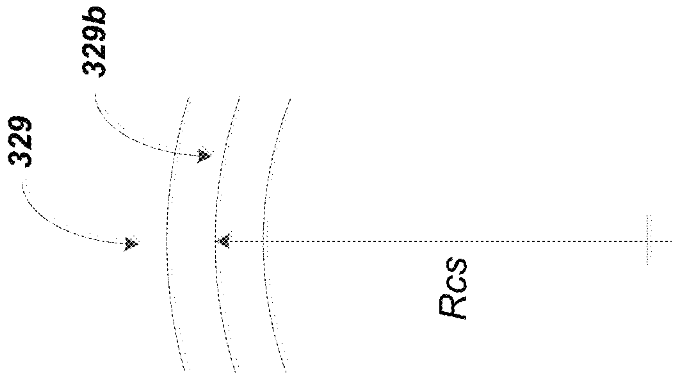
FIG. 10B illustrates a curved section of the middle portion having a radius Rcs.

Reference to a curved extension module may be understood as an extension module having one or a plurality of curved sections between the upstream portion 328 (proximate the anode module not shown) and the nozzle module 336. The one or plurality of curved sections may also be combined with one or a plurality of straight sections. The curved section may be defined herein as having a centerline radius Rcs which as illustrated in FIG. 10B is determined from a location at the centerline 329*b* of the PEM 324. The radius Rcs of the curved section illustrated in FIG. 10B may therefore define a curvature of all or a portion of the middle portion 329. The curved section (CS) may be present as one or a plurality of curved sections wherein each individual curved section defines the same or different radius Rcs, wherein Rcs>(2-3)*Dss. The one or plurality of curved sections with either the same or different values of Rcs may also have geometric shapes other than a circular shape, including but not limited to elliptical, parabolic, hyperbolic their combinations and other types of curvatures to define the middle portion 329.

Figure 11:
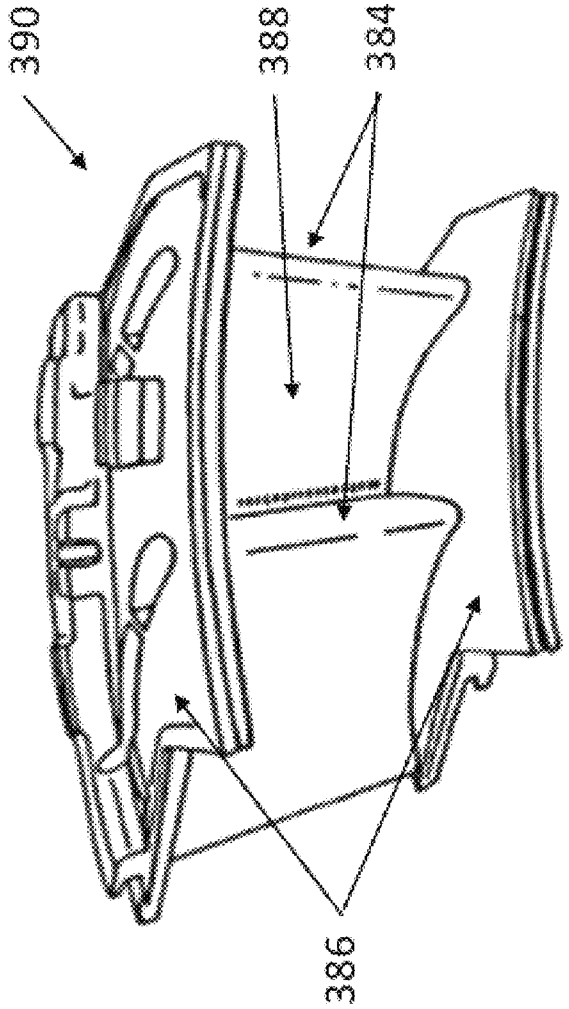
FIG. 11 illustrates a turbine component having two airfoils
Figure 12:
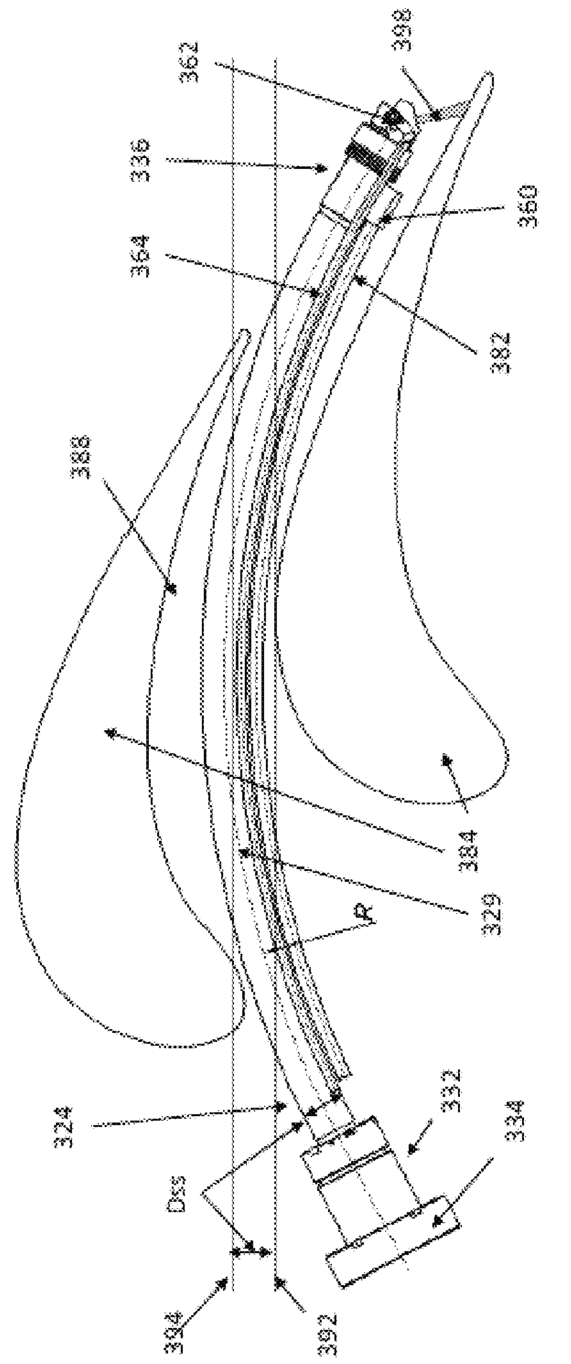
FIG. 12 illustrates a portion of the plasma extension module as positioned in the space between two airfoils.

FIG. 12 illustrates a position of plasma extension module 324 in the space 388 between airfoils 384 of a turbine engine which are also illustrated on FIG. 11. The minimum distance between the airfoils 384 is about 40 mm and locates the area of the trailing edge of the top airfoil. Dss of the middle portion 329 of the extension module 324 is about 18.0 mm. The space between straight lines 392 and 394 is also about 18 mm and these lines imitate a straight extension of the same diameter Dss=18 mm. It may be appreciated that the straight extension is unable to access all areas of the space 388 from one side while the bent extension may spray all areas from one side. Spraying of a coating from 2 sides creates multiple low quality defective overlapping spray zones. It is also typically a relatively long and expensive process as it also requires multiple relocations of a torch and the use of protective masking. For example, a common practice for thermal barrier ceramic coatings is spraying not more 20 microns of a coating per a cycle consisting of multiple overlapping passes while the total coating thickness may be required of about 1.0 mm or even more. Thus, at least 50 cycles are required with multiple passes within one cycle and the torch and masking are relocated from one side to another at least 50 times as well. Thus, use of the bent plasma extension module 324 can be very beneficial for these type of nozzles having two or even three airfoils and complex geometry transition pieces utilized in turbine power generation and other applications. It can also create unique advantages when a straight extension does not provide a proper access to areas requiring spraying, coating and protection, while the bent extension herein can have access to all areas to be sprayed. Accordingly, the plasma apparatus herein may be utilized to provide coatings for various components of the turbine engine, including but not limited to the airfoils, vanes, combustors, transition pieces, etc.

Figure 13:
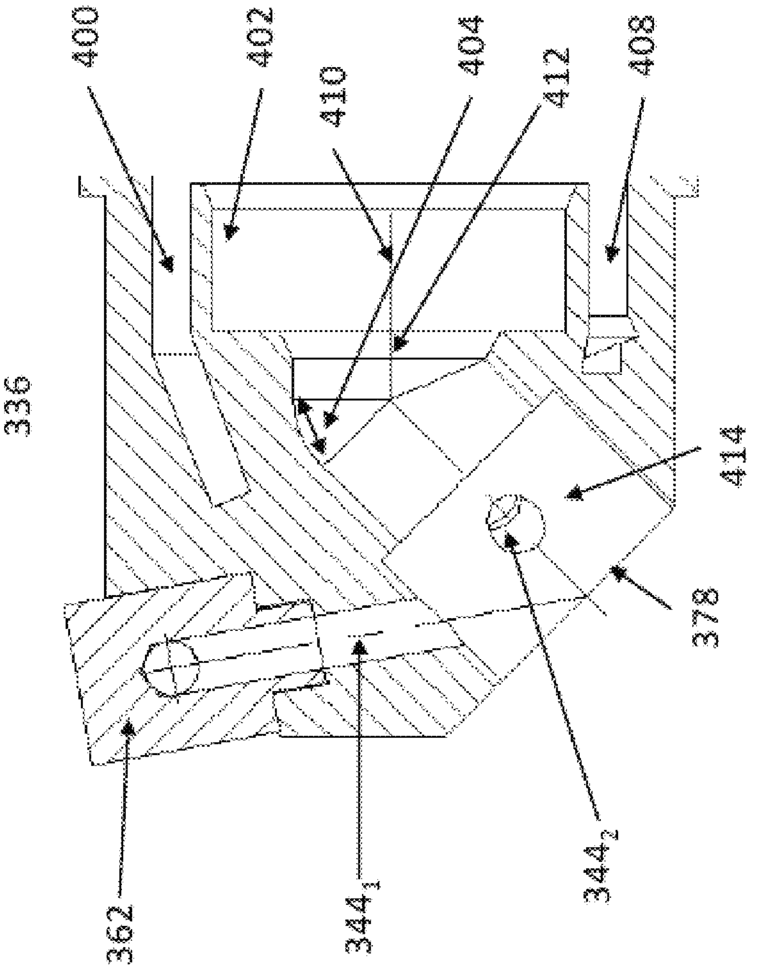
FIG. 13 illustrates a nozzle module that may be employed herein for attachment to the plasma extension module.
Figure 14:
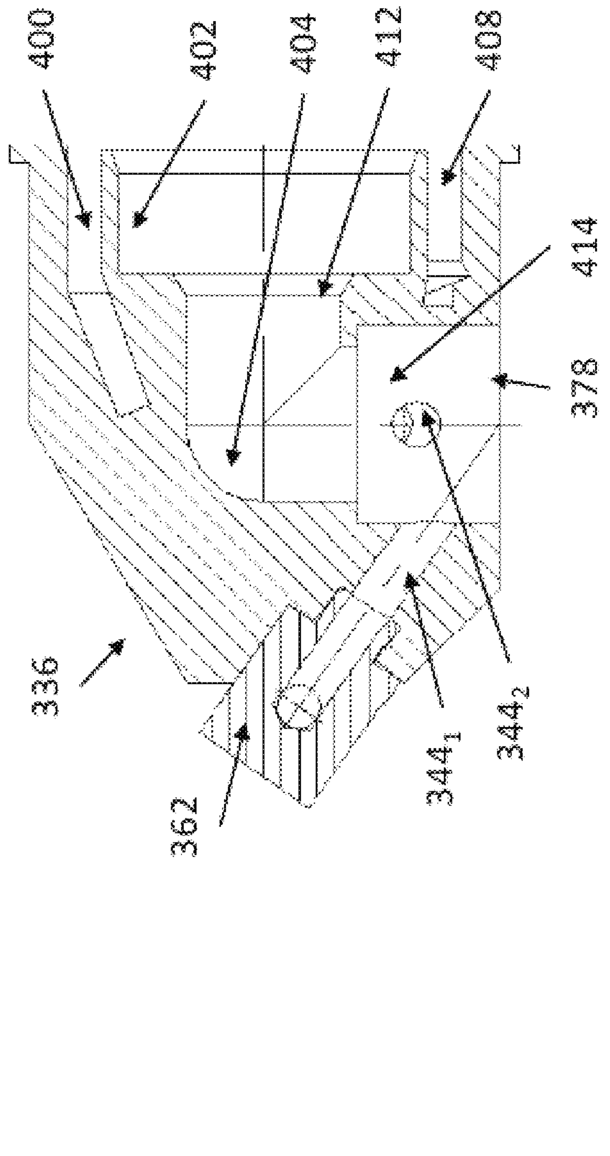
FIG. 14 illustrates a nozzle module that may be employed herein for attachment to the plasma extension module.
Figure 15:
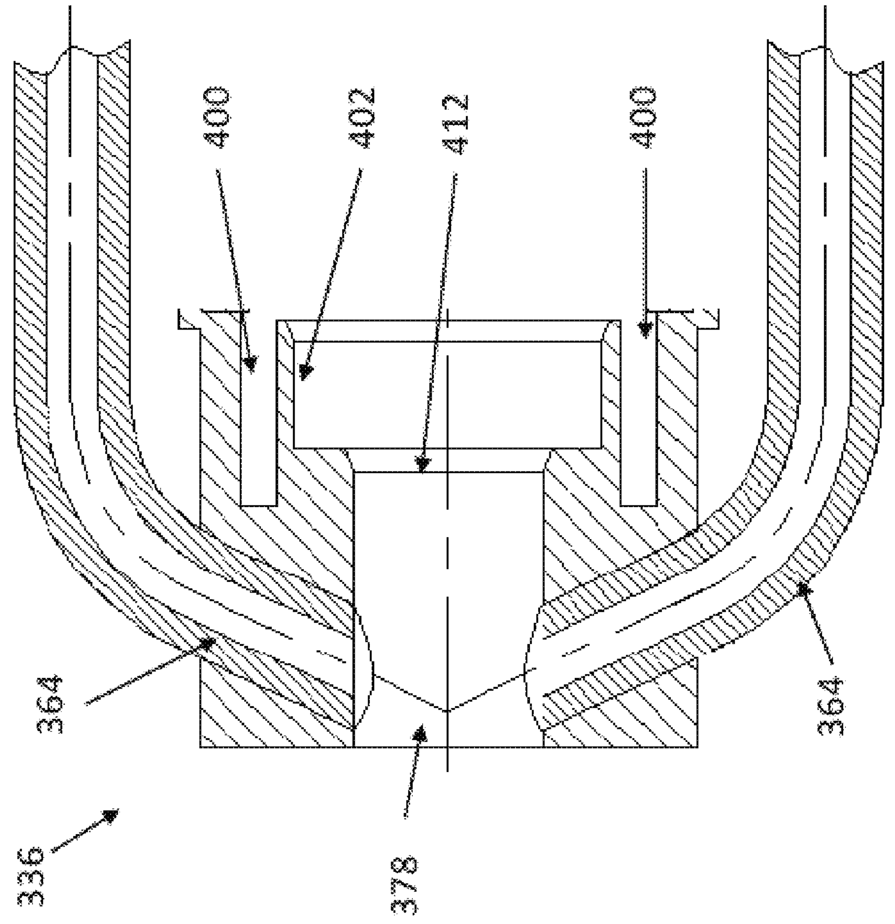
FIG. 15 illustrates yet another nozzle module that may be employed herein for attachment to the plasma extension module.

A variety of different nozzle modules may be used together with the plasma extension module 324 are illustrated in FIGS. 13-15. All of them have passages 400 and 408 for the cooling water. Area 402 serves for the connection with downstream portion 330 of plasma extension 324. The upstream portion 412 of the plasma passage inside a nozzle is preferably coaxial with the exit portion of the plasma passage 340 inside the plasma extension module 324. The downstream portion 414 may have an angle 404 with the upstream portion 412. This angle may be 45 degrees as shown in FIG. 13. It may be 90 degrees as it shown in FIG. 14. A straight nozzle is depicted in FIG. 15. Feedstock lines 364 may be brazed into the straight nozzle 336. Feedstock lines may be also connected to a feedstock holder 362 depicted in FIGS. 13 and 14.

Figure 16:
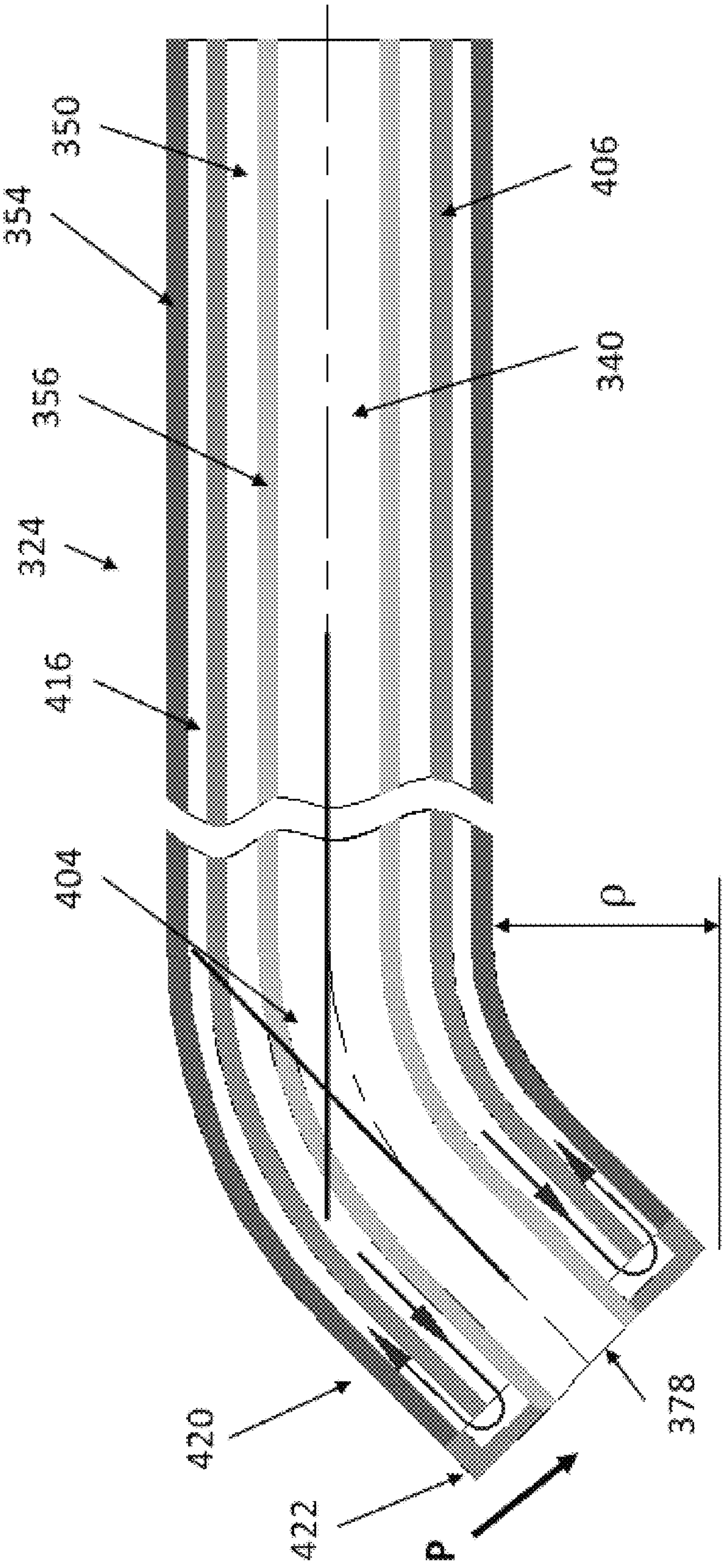
FIG. 16 illustrates the plasma extension module with a bent downstream portion.

It may be noted that the downstream portion 422 of the plasma extension 324 depicted in FIG. 9A, may serve as a nozzle excluding a need for the additional nozzle 336. The downstream portion 420 may be also bent which is illustrated by FIG. 16. Powder P may be injected in the plasma jet outside the 420 in this case. However, increasing of the overall dimensions by p is the tradeoff for the simplicity.

What is claimed is:

1. A plasma apparatus for depositing a coating comprising:

a plasma torch having an electrically conductive cathode and an anode module having an electrically conductive anode spaced apart from said cathode and said torch generates a plasma by applying an electric voltage between said cathode and anode and wherein said anode includes an anode arc root attachment location and a plasma exits said anode module with an enthalpy $H_{AM}$;

said plasma torch further comprising a passageway to feed plasma gas wherein said plasma gas comprises ≥75 vol. % of molecular gas;

an extension module located downstream of said anode arc root attachment location, the extension module containing said plasma and having a length of ≥150 mm from said anode arc root attachment location wherein said extension module includes one or a plurality of curved sections having a curved centerline for travel of said plasma gas; and said plasma exits said extension module with an enthalpy ($H_{EXIT}$) of ≥15 kJ/g.

2. The plasma apparatus of claim 1 wherein said extension module has a length of ≥150 mm to 1050 mm.

3. The plasma apparatus of claim 1 wherein $H_{EXIT}$ has a value of ≥15 kJ/g to 50 kJ/g.

4. The plasma apparatus of claim 1 wherein said extension module comprises a plurality of module components.

5. The plasma apparatus of claim 1 wherein said extension module includes an outer sleeve having a diameter Dss surrounding inner tubing which inner tubing contains said plasma.

6. The plasma apparatus of claim 5 wherein said outer sleeve has a diameter Dss of 7.0 mm to 35.0 mm.

7. The plasma apparatus of claim 5 wherein said inner tubing has an outer and inner surface, and one or a plurality of grooves are formed in said outer surface of said inner tubing for passage of a coolant.

8. The plasma apparatus of claim 7 wherein said grooves have a width of 1.0 mm to 3.0 mm and a depth of 0.5 mm to 2.0 mm.

9. The plasma apparatus of claim 1 wherein said extension module includes one or more straight sections.

10. The plasma apparatus of claim 1 wherein said one or more curved sections has a radius Rcs having the same or different values.

11. The plasma apparatus of claim 1 wherein said extension module comprises one curved section.

12. The plasma apparatus of claim 1 including feedstock lines to deliver feedstock to said plasma.

13. The plasma apparatus of claim 1 wherein said plasma extension module is electrically insulated from said torch.

14. The plasma apparatus of claim 1 wherein $H_{AM}$ has a value in the range of 30 kJ/g to 80 kJ/g.

15. The plasma apparatus of claim 1 wherein said plasma torch generates a plasma at a voltage (U) above 100 V and current (I) below 500 A comprising:

an interelectrode module controlling said plasma between said cathode and said anode having one end adjacent said cathode and a second end adjacent said anode module and having a pilot insert adjacent to said cathode;

at least one neutral inter-electrode insert;

said plasma torch further comprising two passageways to feed plasma gas in a total amount Gp wherein (U)(I)/(Gp) is in the range of 43 kJ/g-140 kJ/g;

wherein one of said passageways for feeding plasma gas comprises a first plasma gas passage located between said cathode and pilot insert for feeding plasma gas in amount G1 wherein said gas is directed through a plurality of orifices having a surface area S1 wherein a vortex is formed having a vortex intensity Vort1=G1/S1;

wherein one of said passageways for feeding plasma gas comprises a second plasma gas passage located between said interelectrode module and said cylindrical part of anode for feeding plasma gas in an amount G2;

wherein said gas is directed through a plurality of orifices having a surface area S2 wherein a vortex is formed having a vortex intensity Vort2=G2/S2; and wherein G1 is greater than 0.6 Gp and Vort1=G1/S1 is greater than 0.1 g/((sec)($mm^2$)) and wherein said Vort2 is greater than 0.1 g/((sec)($mm^2$)) and smaller than 0.4 g/((sec)($mm^2$)).

* * * * *